(12) United States Patent
Kusakabe

(10) Patent No.: US 9,092,722 B2
(45) Date of Patent: Jul. 28, 2015

(54) PRINTING CONTROL APPARATUS, CONTROL METHOD, AND STORAGE MEDIUM

(75) Inventor: Yuki Kusakabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 212 days.

(21) Appl. No.: 12/984,540

(22) Filed: Jan. 4, 2011

(65) Prior Publication Data

US 2011/0164272 A1 Jul. 7, 2011

(30) Foreign Application Priority Data

Jan. 7, 2010 (JP) .................................. 2010-001773

(51) Int. Cl.
*G06K 15/00* (2006.01)
*G06F 3/12* (2006.01)

(52) U.S. Cl.
CPC .............. *G06K 15/402* (2013.01); *G06F 3/126* (2013.01); *G06F 3/1208* (2013.01); *G06F 3/1232* (2013.01); *G06F 3/1256* (2013.01); *G06F 3/1288* (2013.01)

(58) Field of Classification Search
USPC ........................ 385/1.14–1.15; 358/1.14–1.15
See application file for complete search history.

(56) References Cited

U.S. PATENT DOCUMENTS

| | | | | |
|---|---|---|---|---|
| 2006/0192997 A1* | 8/2006 | Matsumoto et al. | .......... | 358/1.15 |
| 2007/0247664 A1* | 10/2007 | Yamamoto | .................... | 358/1.16 |
| 2009/0195821 A1* | 8/2009 | Matoba | ........................ | 358/1.15 |
| 2009/0296119 A1* | 12/2009 | Kurihara | ........................ | 358/1.9 |
| 2009/0300519 A1* | 12/2009 | Sakiyama et al. | ............. | 715/753 |
| 2010/0123911 A1* | 5/2010 | Guay | ............................. | 358/1.9 |
| 2010/0149590 A1* | 6/2010 | Nishiyama et al. | .......... | 358/1.15 |
| 2010/0157350 A1* | 6/2010 | Yoshihara et al. | ........... | 358/1.14 |
| 2011/0149333 A1* | 6/2011 | Hong | ........................... | 358/1.15 |
| 2011/0164272 A1* | 7/2011 | Kusakabe | .................... | 358/1.14 |

FOREIGN PATENT DOCUMENTS

JP  2007-317169 A  12/2007

* cited by examiner

*Primary Examiner* — Marivelisse Santiago Cordero
*Assistant Examiner* — Kevin Ky
(74) *Attorney, Agent, or Firm* — Canon U.S.A., Inc. IP Division

(57) ABSTRACT

Feed information is acquired from a server using a URL designated from a user of a PC. The feed information is compared with a print condition designated by the user of the PC, to acquire document information that matches the print condition. Out of a plurality of image forming apparatuses registered for users, the image forming apparatus capable of performing printing is selected. Preview of document information acquired according to print setting set in the image forming apparatus is generated. Feed information having the generated preview and information relating to the image forming apparatus capable of performing printing added thereto are transmitted to the PC.

20 Claims, 14 Drawing Sheets

FIG.4

```
<?xml version="1.0" encoding="UTF-8"?>

<rss version="2.0" xmlns:dc="www.xxx.com/">
 <channel>
  <title>DOCUMENT MANAGEMENT SERVER</title>
  <link>http://s-2004-p05165/xxxxx/DocLib/Forms/AllItems.aspx</link>
  <description>THIS IS FEED OF DOCUMENT MANAGEMENT SERVER.</description>
  <image>
   <title>SPECIFICATION MANAGEMENT FOLDER</title>
   <url>/xxxxx/_layouts/images/homepage.gif</url>
   <link>http://s-2004-p05165/xxxxx/DocLib/Forms/AllItems.aspx</link>
  </image>
  <item>
   <title>WHAT-DO-YOU-CALL-SPECIFICATION</title>
   <link>http://s-2004-p05165/xxxxx/DocLib/Forms/DispForm.aspx?ID=7</link>
   <description>
    SPECIFICATION IS MADE PUBLIC.
   </description>
   <author>S-2004-P05165/administrator</author>
   <pubDate>Mon, 08 Sep 2008 09:33:11 GMT</pubDate>
   <dc:encoded>
    <![CDATA[
    <thumb>http:////s-2004-p05165/xxxxx/DocLib/docimage.png</thumb>
    <Owner>User A</Owner>
    <Status>Public</Status>
    ]]>
   </dc:encoded>
  </item>
 </channel>
</rss>
```

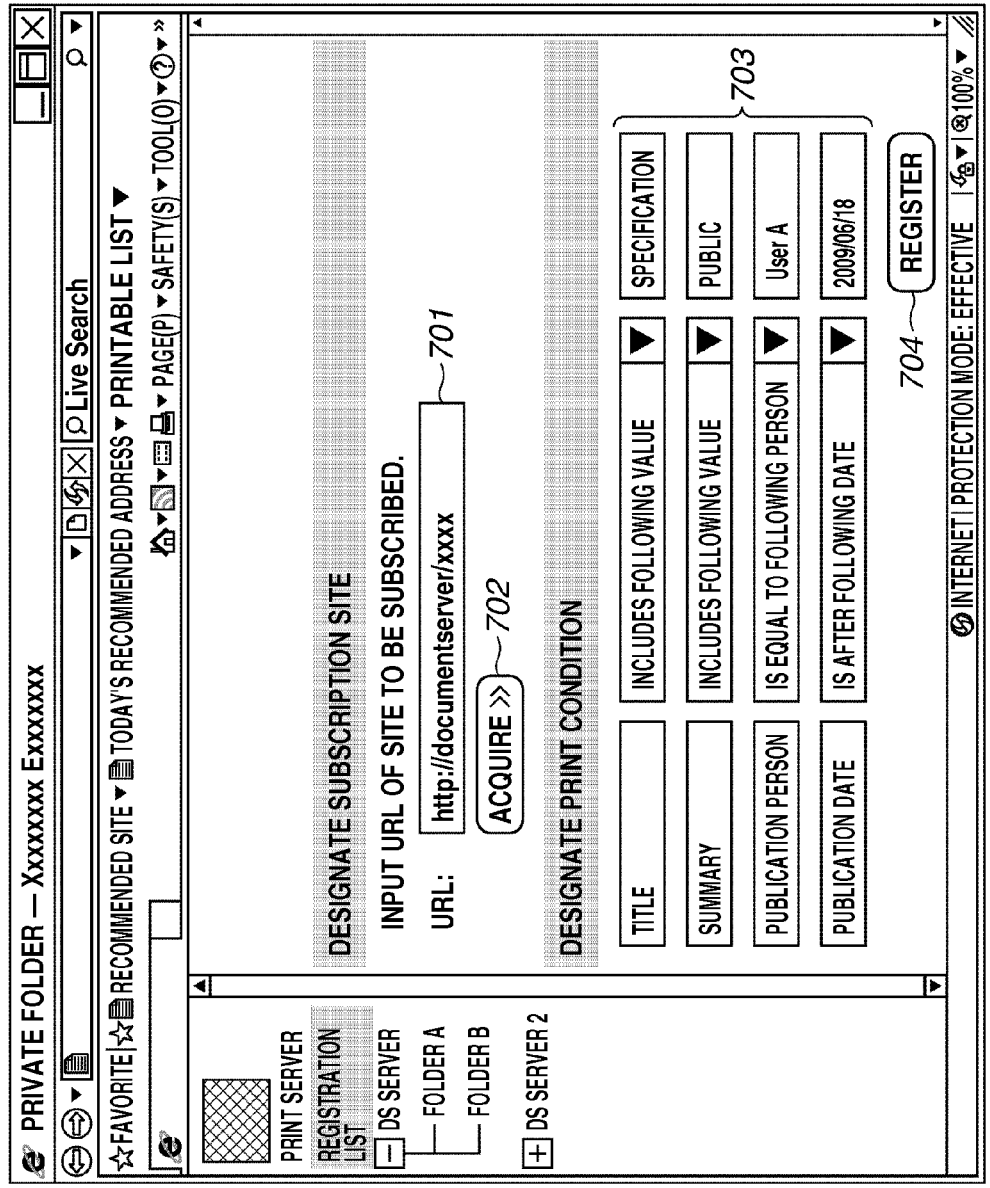

FIG.8

| ELEMENT INFORMATION | CONVERSION CHARACTER STRING | SEARCH CONDITION |
|---|---|---|
| <title> | TITLE | KEYWORD SEARCH |
| <description> | SUMMARY | KEYWORD SEARCH |
| <author> | PUBLICATION PERSON | KEYWORD SEARCH |
| <pubDate> | PUBLICATION DATE | DATE SEARCH |

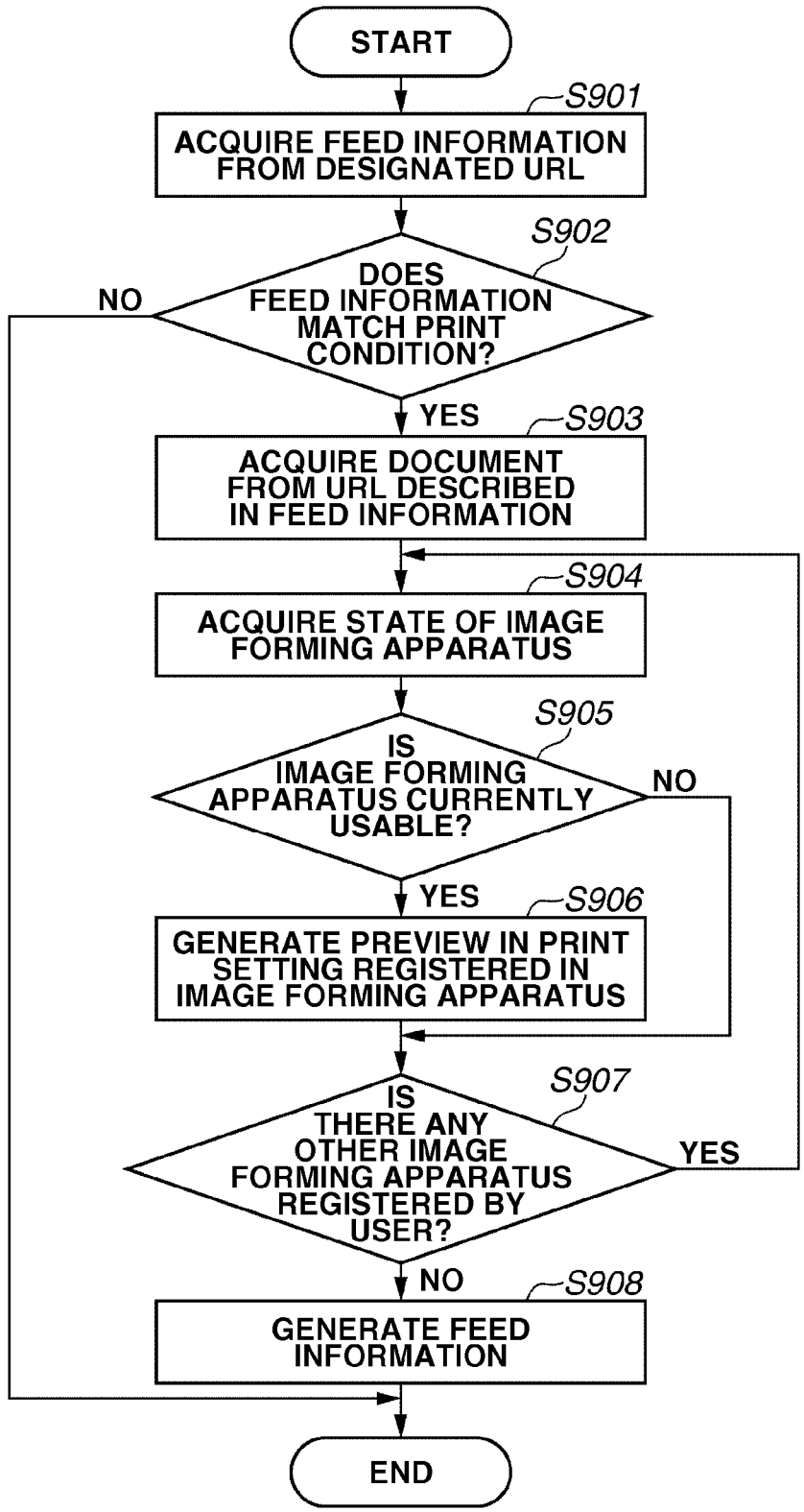

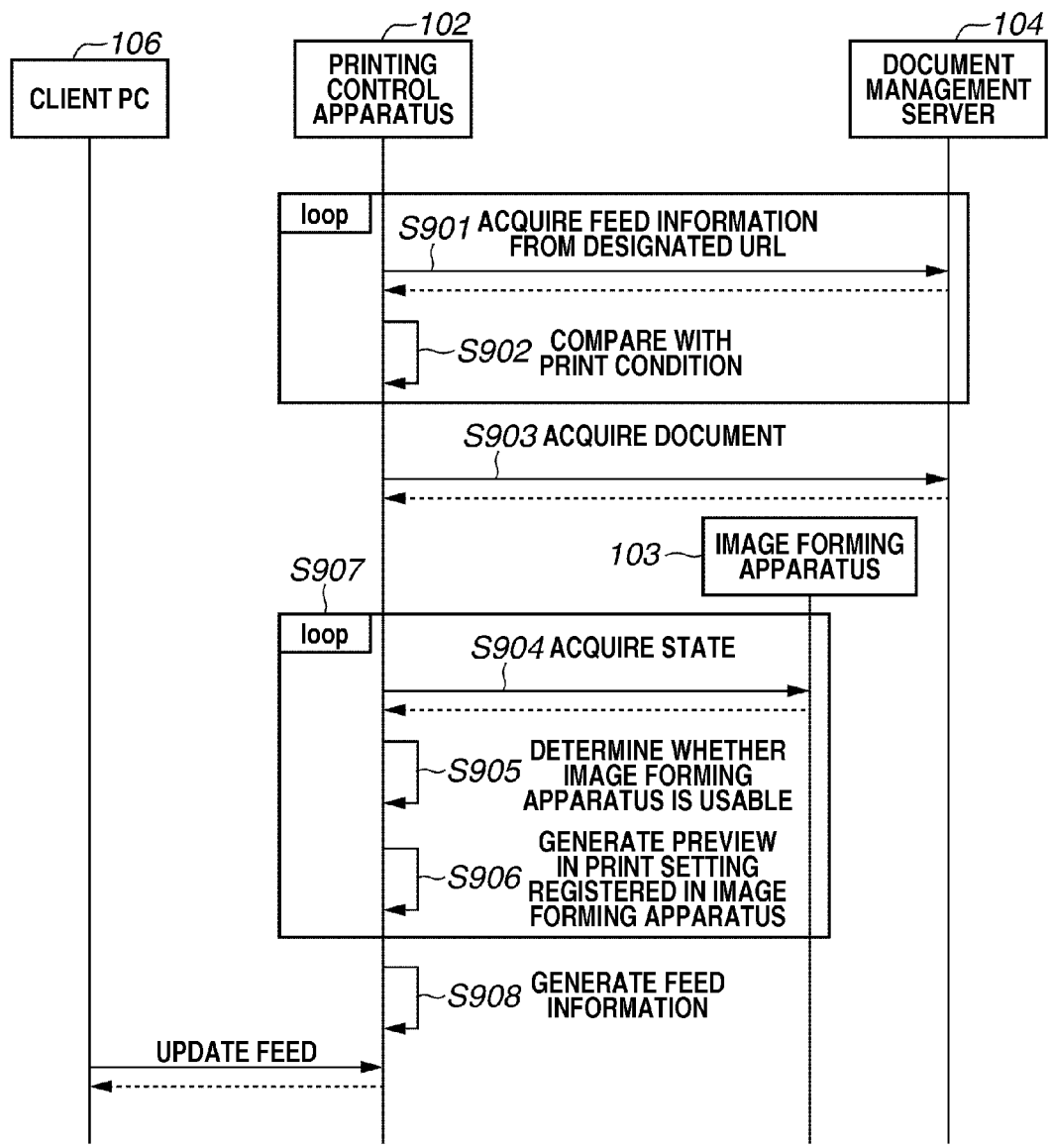

FIG.10

```
<?xml version="1.0" encoding="UTF-8"?>

<rss version="2.0" xmlns:dc="www.xxx.com/">
  <channel>
    <title>DOCUMENT MANAGEMENT SERVER</title>
    <link>http://s-2004-p05165/xxxxx/DocLib/Forms/AllItems.aspx</link>
    <description>THIS IS FEED OF DOCUMENT MANAGEMENT SERVER.</description>
    <image>
      <title>SPECIFICATION MANAGEMENT FOLDER</title>
      <url>/xxxxx/_layouts/images/homepage.gif</url>
      <link>http://s-2004-p05165/xxxxx/DocLib/Forms/AllItems.aspx</link>
    </image>
    <item>
```
1001 — `<title>WHAT-DO-YOU-CALL-SPECIFICATION</title>`
```
      <link>http://s-2004-p05165/xxxxx/DocLib/Forms/DispForm.aspx?ID=7</link>
```
1005

1002 —
```
      <description>
        SPECIFICATION IS MADE PUBLIC.
      </description>
```
1003 — `<author>User A</author>`
1004 — `<pubDate>Mon, 22 June 2009 09:33:11 GMT</pubDate>`
```
      <dc:encoded>
        <![CDATA[
        <thumb>http:////s-2004-p05165/xxxxx/DocLib/docimage.png</thumb>
        <Owner>User A</Owner>
        <Status>Public</Status>
        ]]>
      </dc:encoded>
    </item>
  </channel>
</rss>
```

FIG.11

```
<?xml version="1.0" encoding="UTF-8"?>

<rss version="2.0" xmlns:dc="www.xxx.com/">
 <channel>
```
```
   <title>PRINTING CONTROL APPARATUS</title>
   <link>http://xxxxx/xxxxx/PrintServer/AllItems.aspx</link>
   <description>
     THIS IS FEED OF PRINTER PORTLET.
     PRINTER 2 IS READY FOR PRINTING.
   </description>
   <image>
     <title>2 in 1 PREVIEW</title>
     <url>/xxxxx/_layouts/images/2in1.gif</url>
     <link>http://xxxxx/xxxxx/PrintServer/AllItems.aspx</link>
   </image>
```
1101

```
   <item>
     <title>WHAT-DO-YOU-CALL-SPECIFICATION</title>
     <link>http://xxxxx/xxxxx/PrintServer/AllItems.aspx?ID=7</link>
     <description>
       SPECIFICATION IS MADE PUBLIC.
     </description>
     <author>User A</author>
     <pubDate>Mon, 22 June 2009 09:33:11 GMT</pubDate>
     <dc:encoded>
      <![CDATA[
      <thumb>http:////s-2004-p05165/xxxxx/DocLib/docimage.png</thumb>
      <Owner>User A</Owner>
      <Status>Public</Status>
      ]]>
     </dc:encoded>
   </item>
  </channel>
</rss>
```

PRINTING CONTROL APPARATUS, CONTROL METHOD, AND STORAGE MEDIUM

BACKGROUND OF THE INVENTION

1. Field of the Invention

The present invention relates to a printing control apparatus for managing a plurality of image forming apparatuses, a printing control method, and a program.

2. Description of the Related Art

In a system for managing an image forming apparatus, a shift to thin client has also been accelerated in an office environment to enhance internal control and security and reduce personal computer (PC) management cost. The shift to thin client has progressed such that web services for performing processing on the side of a server have been provided one after another.

One of their service forms is a web portal. The web portal can aggregate various services and display the aggregated services on one screen. Each service managed and displayed by the portal is referred to as a portlet.

By the portlet, news, an electronic mail, document management and print services, and so on can be provided.

Each of functions is serviced so that a plurality of services can be used on one screen at the same time on a web browser. However, the services do not cooperate corporate with one another because they are independent services.

Therefore, there is no means for immediately printing a document provided by a document management service. A user is to select, out of printers in the print service, the printer currently usable and give a print instruction to perform printing.

In order to solve this problem, means for an image forming apparatus to confirm updating of a document on a document management service and perform printing has been proposed (e.g., Japanese Patent Application Laid-Open No. 2007-317169).

When the image forming apparatus confirms updating of the document on the document management service and performs printing, however, the printing is always performed only in the image forming apparatus. Therefore, printing may not be performed, depending on a status of the image forming apparatus. Thus, convenience is not improved.

SUMMARY OF THE INVENTION

The present invention is directed to providing a mechanism capable of transmitting feed information, when the feed information that matches a print condition of registered document information is acquired from a server apparatus, to an information processing apparatus after adding information relating to an image forming apparatus capable of performing printing to the feed information.

According to an aspect of the present invention, a printing control apparatus that can communicate with an image forming apparatus and an information processing apparatus operated by a user includes a first acquisition unit configured to acquire feed information using a uniform resource locator (URL) designated from the information processing apparatus, a second acquisition unit configured to acquire a document, when the feed information acquired by the first acquisition unit matches a print condition notified from the information processing apparatus, from a storage destination of documents to be printed, which are described in the feed information, a generation unit configured to generate a preview image based on print setting information set in the image forming apparatus for printing the document acquired by the second acquisition unit and based on the document, and a transmission unit configured to transmit feed information including status information relating to the image forming apparatus and the preview image, to the information processing apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates an example of feed information managed by a document management control unit.

FIG. 7 illustrates an example of a user interface (UI) displayed by an information processing apparatus.

FIG. 8 illustrates elements that can be registered by a user on a UI screen illustrated in FIG. 7.

FIGS. 9A and 9B are flowcharts illustrating a data processing procedure in the printing control apparatus.

FIG. 10 illustrates feed information managed by the printing control apparatus.

FIG. 11 illustrates feed information managed by the printing control apparatus.

DESCRIPTION OF THE EMBODIMENTS

Various exemplary embodiments, features, and aspects of the invention will be described in detail below with reference to the drawings.

Figure 1:
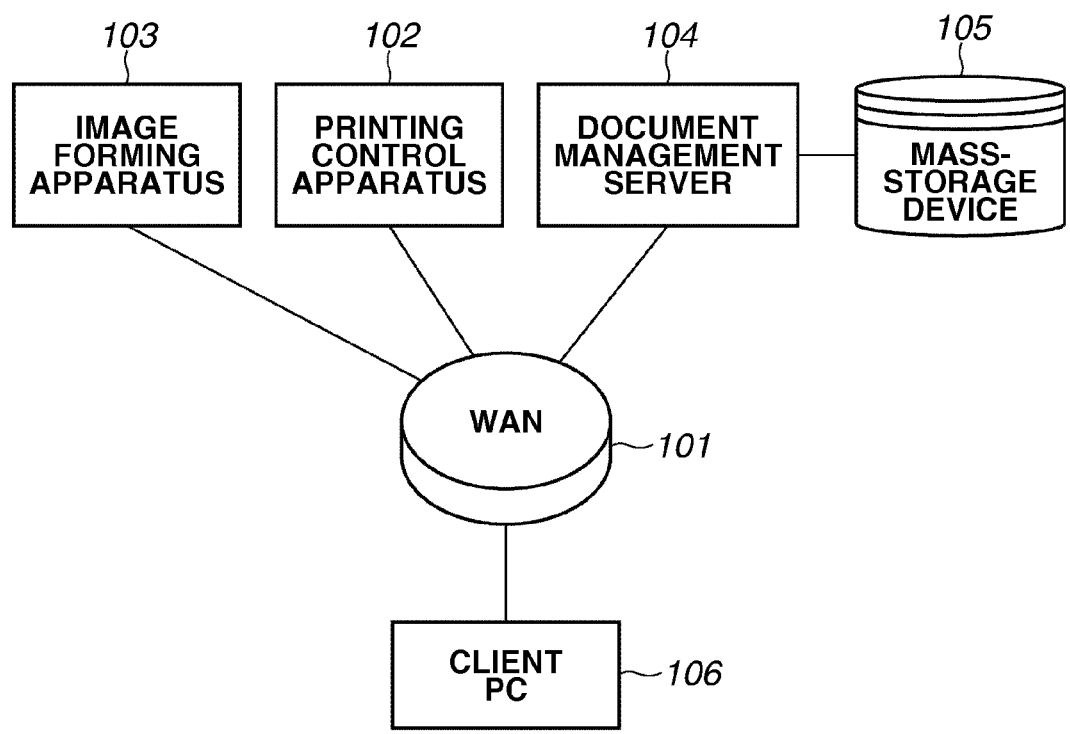
FIG. 1 is a block diagram illustrating a configuration of a printing control system.

FIG. 1 is a block diagram illustrating a configuration of a printing control system according to an exemplary embodiment of the present invention. This system is configured by connecting a printing control apparatus 102, an image forming apparatus 103, and a document management server (server) 104 to a client PC (PC) 106 via a network (wide area network (WAN)) 101. While a plurality of image forming apparatuses or PCs are generally connected on the WAN 101, only one image forming apparatus or PC is connected in the figure for the sake of illustration.

In FIG. 1, the server 104 can provide a document management service, and store document information in a mass-storage device 105. As the document information stored in the mass-storage device 105 is to be accessed, the server 104 transfers the document information stored in the mass-storage device 105 upon request from another server system to acquire the document information. Thus, the document information can be acquired via the WAN 101.

The printing control apparatus 102 manages a plurality of image forming apparatuses 103 which can be selected for each user logging in, controls and monitors a print job, and sends the print job. The printing control apparatus 102 can communicate with the server 104 via the WAN 101. Further, the printing control apparatus 102 has a function of generating a preview image conforming to print setting of each of the image forming apparatuses 103 according to a flowchart, described below, and a function of acquiring a status (including a printable state) of each of the image forming apparatuses 103.

The image forming apparatus 103 prints the print job received from the printing control apparatus 102. The image forming apparatus 103 includes all types of printing apparatuses such as a laser beam printer using an electrophotographic method, an inkjet printer using an inkjet method, and a printer using a thermal transfer method.

Communication between the apparatuses included in the printing control system may be wired using an Ethernet (trademark) cable or the like or wireless using a radio wave, light, or the like.

The client PC 106 is used to perform information processing, and may be an information processing apparatus. The client PC 106 can communicate with various server systems and control apparatuses via the WAN 101. A web browser for executing a web service is installed on the client PC 106. The client PC 106 can use the web service via the web browser.

In the present exemplary embodiment, it is assumed that a plurality of image forming apparatuses, document management servers, and client PCs, or a plurality of similar configurations to those of the image forming apparatus 103, the server 104, and the client PC 106 exist.

Each of the printing control apparatus 102, the image forming apparatus 103, the server 104, and the client PC 106 includes a controller unit including a central processing unit (CPU), a read-only memory (ROM), and a random access memory (RAM) as hardware resources, and a network controller for performing communication with a network. An operating system is installed in a hard disk or the like included in each of the server 104 and the client PC 106, to control execution of various types of applications.

Figure 2:
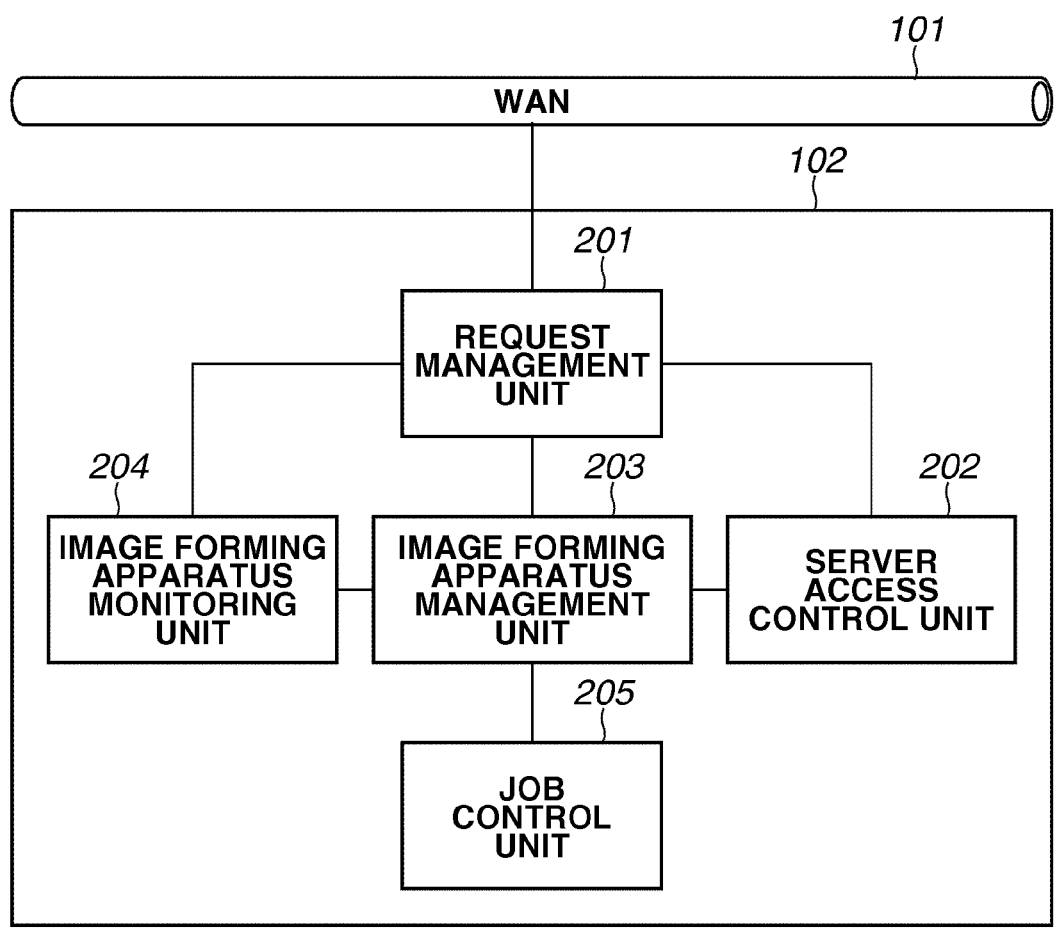
FIG. 2 is a block diagram illustrating a configuration of a printing control apparatus.

FIG. 2 is a block diagram illustrating a configuration of the printing control apparatus 102 in FIG. 1.

In FIG. 2, a request management unit 201 in the printing control apparatus 102 accepts a print request, print setting registration, server access destination registration, and server information acquisition request from a user via the web browser on the client PC 106. The request management unit 201 accepts a request to acquire a status of the image forming apparatus 103, from an image forming apparatus monitoring unit 204 and a request to acquire server information, from a server access control unit 202.

The print request is an instruction issued to the image forming apparatus 103 from the user. In the present exemplary embodiment, it is assumed that the print instruction is issued to the image forming apparatus 103 via the printing control apparatus 102. The request management unit 201 that has received the print request notifies the print request to an image forming apparatus management unit 203.

The image forming apparatus management unit 203 can manage one or more image forming apparatuses 103, and can register print setting (an output paper size and appearance setting) that can be designated by the image forming apparatus 103. The image forming apparatus management unit 203 that has received the print request makes the print setting, and instructs a job control unit 205 to generate a job.

The image forming apparatus management unit 203 can register the image forming apparatus 103 used for each user, and can notify the registered print setting in the image forming apparatus 103 to the client PC 106 according to a user's request and can register and change the print setting.

The server access control unit 202 acquires, analyzes, and generates the server information registered by the user. Details of the server access control unit 202 will be described below.

The image forming apparatus monitoring unit 204 monitors a status of the image forming apparatus 103 registered in the image forming apparatus management unit 203. "Status" means a status of the image forming apparatus 103, for example, a printable state or a printing state.

Figure 3:
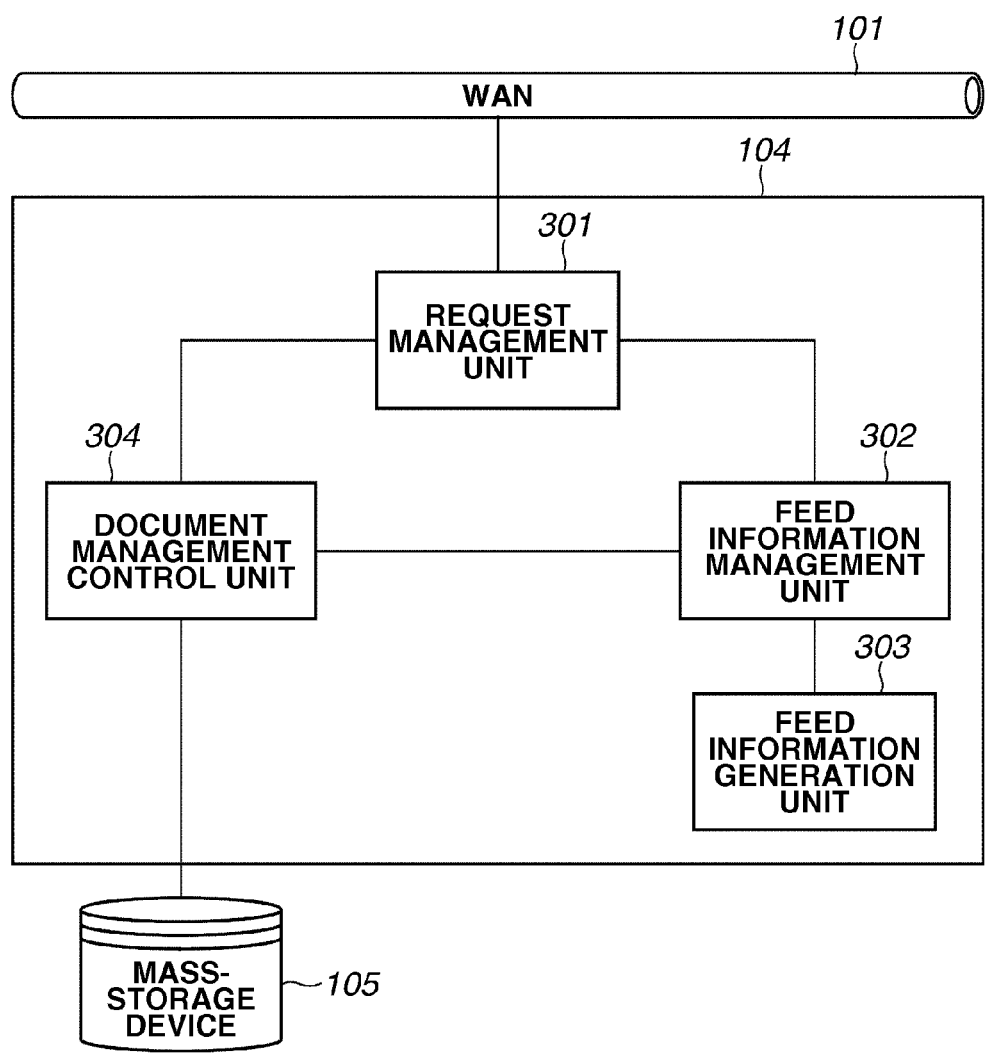
FIG. 3 is a block diagram illustrating a configuration of modules in a document management server.

FIG. 3 is a block diagram illustrating a configuration of modules included in the server 104 in FIG. 1. Each of the modules is stored in a hard disk or the like included in the server 104, and is loaded into the RAM and executed by the CPU, as needed, to implement corresponding functional processing.

In FIG. 3, a request management unit 301 accepts a request to store document information and accepts a request to acquire a stored document and a request to acquire feed information via the web browser on the client PC 106 from the user.

In response to the request to store document information, the document information is stored, which has been sent via the WAN 101, in the mass-storage device 105. When a request to acquire the document information stored in the mass-storage device 105 is received via the WAN 101, the document information responsive to the acquisition request is transferred to an acquisition request source.

A document management control unit 304 executes processing in response to the request to store and the request to acquire the document information. The request management unit 301 sends the acquisition request to the feed information of a feed information management unit 302.

"Feed information" represents a state of the document information managed by the document management control unit 304, and has a file format generated or processed to respond to a request from another server system.

Feed information relating to the present exemplary embodiment will be described below with reference to FIG. 4.

FIG. 4 illustrates an example of the feed information managed by the document management control unit 304 illustrated in FIG. 3. In this example, the feed information is generated in a structured extensible markup language (XML).

The feed information includes information representing a position where document information that can be designated by the document management control unit 304 is stored (e.g., a URL) and information attached to the document information managed by the document management control unit 304 (e.g., an updating date and time and an updating person).

While representative file format is a rich site summary (RSS) or Atom, the format is not limited to these.

The feed information management unit 302 transfers the feed information in response to a request received from the request management unit 301.

The feed information management unit 302 periodically monitors the document management control unit 304, and confirms whether there is a change in a state of the document information. The feed information management unit 302 notifies, if it determines that the change has occurred, information representing an area where the change has occurred, to a feed information generation unit 303.

The feed information generation unit 303 updates the feed information based on the information received from the document management control unit 304 by the feed information management unit 302.

The server access control unit 202 illustrated in FIG. 2 will be described with reference to FIG. 5.

Figure 5:
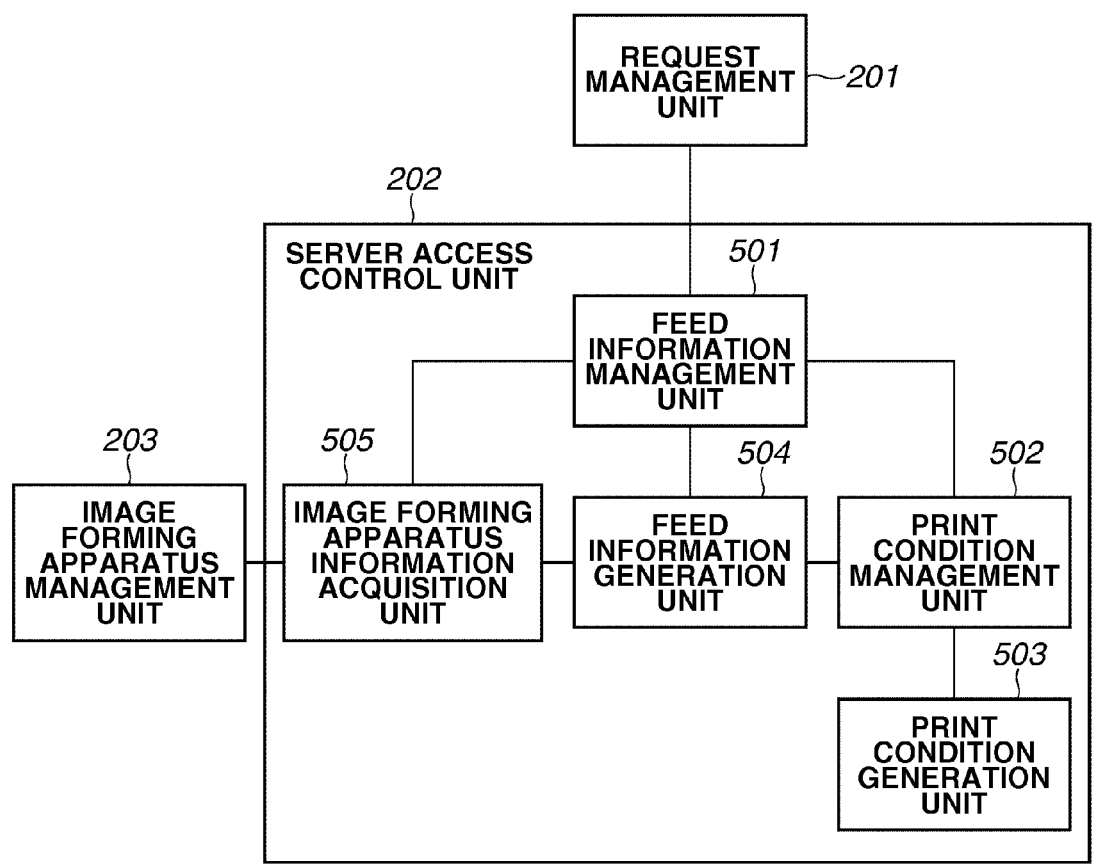
FIG. 5 is a block diagram illustrating a configuration of modules in a server access control unit.

FIG. 5 is a block diagram illustrating a configuration of modules in the server access control unit 202 included in the printing control apparatus 102 illustrated in FIG. 2.

In FIG. 5, a feed information management unit 501 acquires the feed information managed by the feed information management unit 302 in the server 104 and generates a registration screen. A print condition management unit 502 stores a print condition generated from the feed information acquired from the server 104.

A print condition generation unit 503 generates a print condition from the feed information acquired from the server 104. A feed information generation unit 504 transfers the feed information generated while adding information relating to the image forming apparatus 103 to the feed information designated from the print condition management unit 502 as new feed information to the feed information management unit 501.

An image forming apparatus information acquisition unit 505 acquires the information relating to the image forming apparatus 103 and preview information from the image forming apparatus management unit 203 illustrated in FIG. 2, and transfers the information to the feed information generation unit 504.

A flow for registering information relating to the document management server 104 that desires to acquire document information, in the present exemplary embodiment will be described with reference to FIG. 6.

Figure 6A:
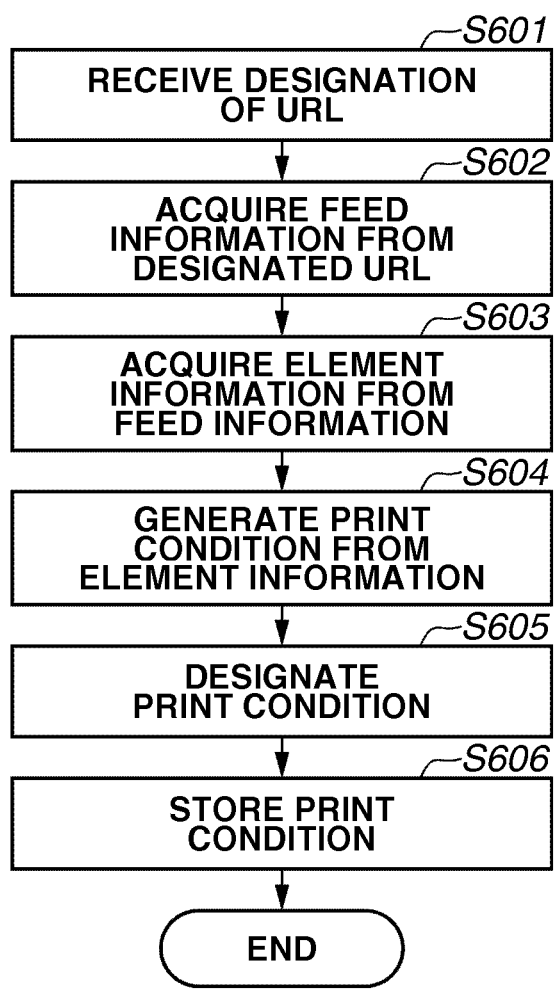
FIGS. 6A and 6B are flowcharts illustrating a data processing procedure in the printing control apparatus.
Figure 6B:
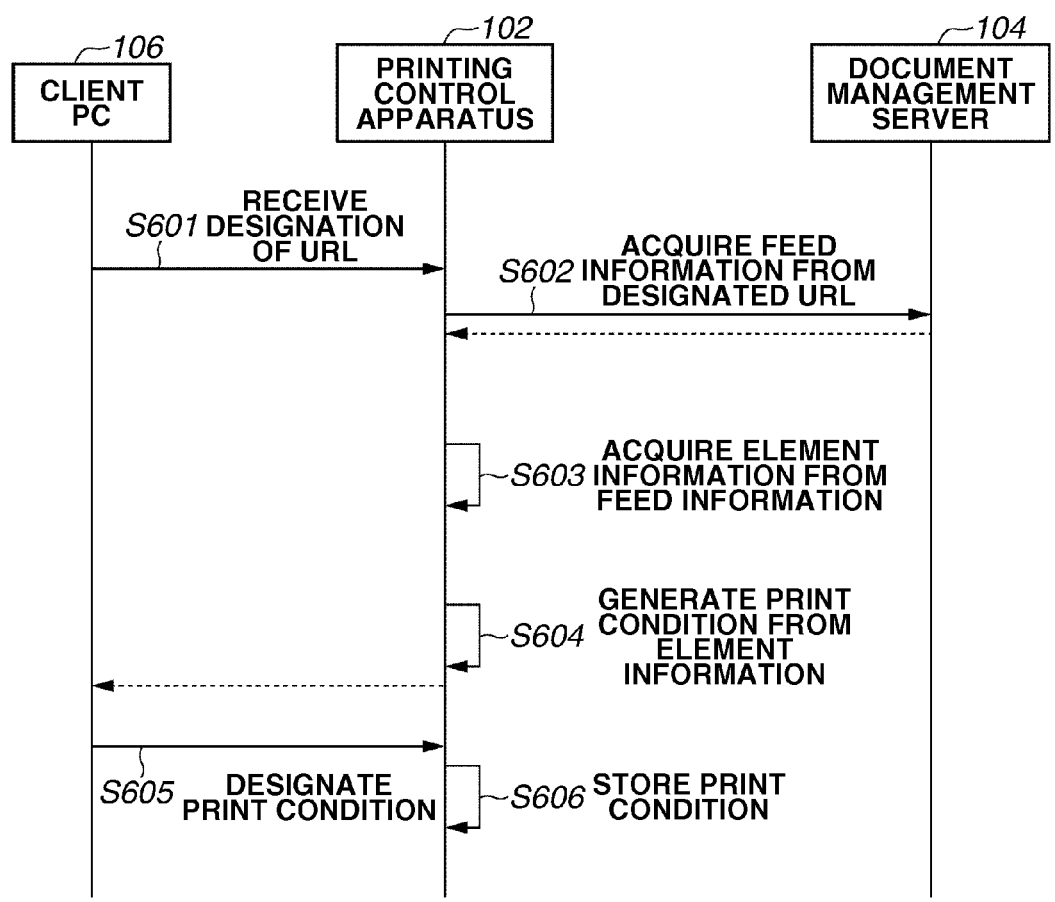

FIG. 6 is a flowchart illustrating an example of a data processing procedure in the printing control apparatus 102 according to the present exemplary embodiment. This example illustrates processing for registering information relating to the document management server 104 that desires to acquire document information. Each of steps S601 to S606 is implemented when the CPU in the printing control apparatus 102 loads a control program stored in an external storage device (e.g., a hard disk) into the RAM and executes the control program. FIG. 6A is a flowchart executed in the printing control apparatus 102, and FIG. 6B illustrates communication between the printing control apparatus 102 and the client PC 106 or the server 104.

When a setting screen is requested from the request management unit 201 illustrated in FIG. 2, the field information management unit 501 sends UI information corresponding to the setting screen to the client PC 106. Thus, a feed registration screen is displayed on a display device according to the UI information received by the web browser on the client PC 106. FIG. 7 illustrates an example of the feed registration screen.

In step S601, the CPU causes, when the user inputs a URL to a URL input unit 701 illustrated in FIG. 7 for the web browser on the client PC 106, the request management unit 201 to receive designation of the URL input by the user.

In step S602, the CPU causes the feed information management unit 501 to acquire from the server 104 the feed information of the designated URL.

FIG. 7 illustrates an example of a screen in which the user inputs "http:documentserver/xxxx" as an acquisition destination of document information to the URL input unit 701.

In FIG. 7, when an acquisition button 702 is pressed according to a user's operation, the input URL is notified to the printing control apparatus 102 from the client PC 106. The printing control apparatus 102 acquires the feed information from the input URL.

In step S603, the CPU causes the print condition generation unit 503 to acquire elements usable as a print condition from element information in the feed information acquired via the print condition management unit 502. In step S604, the CPU generates an input item of the print condition from the element information. The elements usable as the print condition in the feed information are included in "item" in the feed information. Since a table illustrated in FIG. 8 is previously prepared in the present exemplary embodiment, the elements are acquired according to the table. For example, an element "link" is included in "item" in the feed information illustrated in FIG. 4, while not included in the table illustrated in FIG. 8. Therefore, in the present exemplary embodiment, the element "link" is not acquired as an element usable as the print condition. If the table illustrated in FIG. 8 does not exist, the element "link" is also acquired.

The print condition generation unit 503 transfers the generated input item of the print condition to the feed information management unit 501 via the print condition management unit 502. Thus, the generated input item of the print condition is transferred to the web browser on the client PC 106 via the request management unit 201, and is displayed on the display device in the client PC. The result is an input item 703 of a print condition illustrated in FIG. 7. More specifically, the input item 703 of the print condition and a registration button 704 are not displayed on the screen of the display device illustrated in FIG. 7 in the client PC 106 before a process in step S604 is executed.

The input item 703 of the print condition generated from the feed information acquired from the server 104 is displayed in the screen of FIG. 7. When the user designates the print condition for the input item 703 of the print condition, and presses the registration button 704, the designated print condition is registered in the print condition management unit 502 and managed.

While the input item 703 of the print condition is generated from the elements in the feed information, it may be designated by directly displaying the element information, or may be converted into a character string and a search condition, which are associated with the elements, by the print condition generation unit 503 when generated.

An example in which the feed registration screen illustrated in FIG. 7 is generated from the feed information illustrated in FIG. 4 will be described below with reference to FIG. 8.

FIG. 8 illustrates an example of a table for displaying the screen illustrated in FIG. 7 from the feed information.

When the printing control apparatus 102 acquires the feed information illustrated in FIG. 4 from the server 104, for example, the input item 703 of the print condition on the screen illustrated in FIG. 7 is displayed from the feed information according to the table illustrated in FIG. 8. More specifically, the feed information illustrated in FIG. 4 includes an element <title>. Therefore, the element <title> is converted into a "title" and is displayed, as illustrated in FIG. 7. Similarly, the feed information illustrated in FIG. 4 includes an element <description>. Therefore, the element <description> is converted into a "summary" and is displayed, as illustrated in FIG. 7.

When the user of the client PC 106 inputs the print condition ("include the following value", "public", etc.) to the UI screen illustrated in FIG. 7, for example, the request management unit 201 receives designation of the print condition input by the user.

In step S606, the CPU then stores the print condition accepted by the request management unit 201 in the print condition management unit 502, to end the processing.

Processing for the printing control apparatus 102 to generate the feed information having the information relating to the image forming apparatus 103 added thereto will be described below.

FIG. 9 is a flowchart illustrating an example of a data processing procedure in the printing control apparatus 102 according to the present exemplary embodiment. This example illustrates processing for generating the feed information having information relating to a usable image forming apparatus 103 added thereto. FIG. 9A is a flowchart, and FIG. 9B illustrates communication between the printing control apparatus 102 and the client PC 106 or the server 104.

Each of steps S901 to S908 is implemented when the CPU in the printing control apparatus 102 loads a control program stored in the external storage device (e.g., the hard disk) into the RAM and executes the control program.

In step S901, the CPU causes the feed information management unit 501 to first acquire the feed information corresponding to a URL designated by the user of the client PC 106 via the UI illustrated in FIG. 7 from the server 104 via the request management unit 201. In this case, the feed information management unit 501 transfers the acquired feed information to the print condition management unit 502.

In step S902, the CPU causes the print condition management unit 502 to compare a registered print condition with the feed information acquired from the server 104 in step S901, and determines whether the feed information acquired from the server 104 matches the print condition. In the present exemplary embodiment, the print condition can designate a plurality of elements (a title, a summary, a publication person, and a publication date), illustrated as one example in FIG. 7.

If the print condition management unit 502 determines that the feed information does not match the registered print condition (NO in step S902), the processing ends. In addition to the end of the processing, the print condition management unit 502 may determine whether the feed information matches the print condition by performing monitoring at any timing, for example. The registered print condition corresponds to the print condition designated from the client PC 106 by the user via the UI illustrated in FIG. 7, and the designated print condition is registered in a storage device in the printing control apparatus 102 and managed. While the storage device includes a nonvolatile storage device, for example, a hard disk, it may include another nonvolatile storage medium.

On the other hand, if the print condition management unit 502 determines that the feed information acquired from the server 104 matches the registered print condition (YES in step S902), the processing proceeds to step S903. In step S903, the CPU causes the feed information management unit 501 to acquire document information at a document storage destination in the element described in the feed information, from the server 104.

The feed information management unit 501 transfers the document information acquired from the server 104 to the image forming apparatus information acquisition unit 505, and transfers the document information to the image forming apparatus management unit 203 illustrated in FIG. 2.

In step S904, the CPU causes the image forming apparatus management unit 203 to acquire a status of the image forming apparatus 103, for example, via the image forming apparatus monitoring unit 204 based on the information relating to the image forming apparatus 103 managed for each user.

In step S905, the CPU causes the image forming apparatus monitoring unit 204 to determine whether the image forming apparatus 103 is in a printable state at this time. If the image forming apparatus monitoring unit 204 determines that the image forming apparatus 103 is in an unprintable state (NO in step S905), the information relating to the image forming apparatus 103 is not transferred to the image forming apparatus management unit 203.

On the other hand, if the image forming apparatus monitoring unit 204 determines that the image forming apparatus 103 is in a printable state (YES in step S905), the processing proceeds to step S906.

The information relating to the image forming apparatus 103 acquired by the image forming apparatus information acquisition unit 505 is transferred to the image forming apparatus management unit 203. If there exists a plurality of image forming apparatuses 103 capable of performing printing, the image forming apparatus information acquisition unit 505 notifies information relating to the plurality of image forming apparatuses 103 to the image forming apparatus management unit 203.

In step S906, the CPU causes the image forming apparatus management unit 203 that has received the information relating to the image forming apparatuses 103 to transfer the document information to the job control unit 205 to generate a preview image with a print setting registered in the image forming apparatus management unit 203. The job control unit 205 generates the preview image according to the document information and the print setting upon receipt of the document information.

In step S907, the CPU causes the image forming apparatus management unit 203 to determine, from the image forming apparatus 103 registered for each user and its status, whether there is any other image forming apparatus 103 registered by the user. If the image forming apparatus management unit 203 determines that there is any other registered image forming apparatus (YES in step S907), the processing returns to step S904. In step S904, similar processes are repeated a corresponding number of times to the number of image forming apparatuses 103 registered by the user.

If the job control unit 205 then generates preview images for all the image forming apparatuses 103 (NO in step S907), the image forming apparatus management unit 203 transfers the generated preview images and the information relating to the image forming apparatuses 103 capable of performing printing, to the server access control unit 202.

In step S908, the CPU causes the feed information management unit 501 to transfer the preview images and the information relating to the image forming apparatuses 103 to the feed information generation unit 504, add the preview images generated by the job control unit 205 and the information relating to the image forming apparatuses 103 to the feed information acquired from the server 104, and transmit the feed information having both the preview images and the information relating to the image forming apparatuses 103 added thereto to the client PC 106, to end the processing. The feed information having the information relating to the image forming apparatuses 103 added thereto includes information for specifying the image forming apparatus 103 capable of performing printing, e.g., a printer name.

The feed information management unit 501 transmits, when it has received a request to acquire feed information from the client PC 106, the feed information having the preview image generated by the feed information generation unit 504 and the information for specifying the image forming apparatus 103 capable of performing printing added thereto, to the PC 106.

Figure 12:
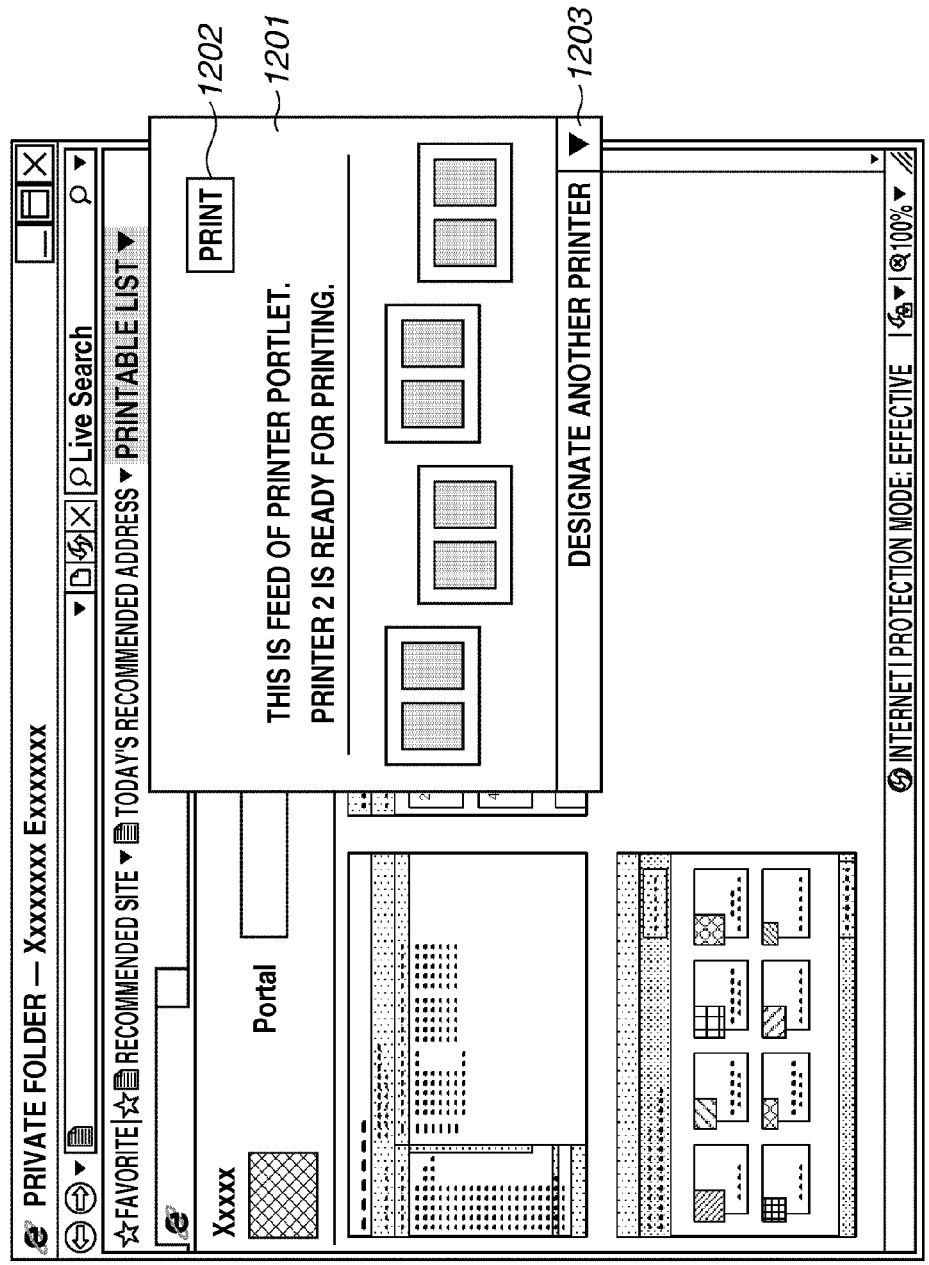
FIG. 12 illustrates an example of a UI displayed on the information processing apparatus.

Thus, the information relating to the image forming apparatuses 103 capable of performing printing and the preview image representing a result of printing performed by each of the image forming apparatuses 103 in the feed information are transmitted to the client PC 106. For example, information relating to the image forming apparatus 103 selected as illustrated in FIG. 12, and a preview image generated by current print setting of the selected image forming apparatus 103 are displayed on the display device via the web browser on the client PC 106.

The flow illustrated in FIG. 9 will be described below using a more specific example.

As a result of acquiring the feed information for a print condition registered by the user using the UI illustrated in FIG. 7, a feed that matches the print condition is acquired. FIG. 10 illustrates an example of feed information in this case.

In FIG. 10, elements 1001 to 1004 match (see step S902 FIG. 9) the print condition registered in FIG. 7. The element 1001 is a title, and includes a registered "specification", and the element 1002 is a summary, and includes a registered "public".

Further, the element 1003 is a disclosing person, and includes a registered "user A", and the element 1004 is a publication date, and includes "2009 Jun. 22" after registered "2009 Jun. 18".

At this time, in steps S903 to S907, the CPU causes the printing control apparatus 102 to acquire document information from a URL 1005 described in the feed information illustrated in FIG. 10, and generate a preview image by the print setting registered in the image forming apparatus 103.

In step S908, the CPU causes the printing control apparatus 102 to transfer the generated preview image and the information relating to the image forming apparatus 103 to the feed information generation unit 504, to generate feed information illustrated as an example in FIG. 11.

In FIG. 11, an element 1101 is added to the feed information illustrated in FIG. 10 in a write-once manner by the feed information generation unit 504. FIG. 12 illustrates an example in which this result is displayed as feed information on the display device in the client PC via the web browser.

A feed display screen 1201 illustrated in FIG. 12 represents a state where a summary included in the element 1101 in the feed information illustrated in FIG. 11 and a preview image serving as an image are displayed on the client PC 106. A print button 1202 issues an instruction to print the document information corresponding to the preview image confirmed by the feed display screen 1201. When the print button 1202 is pressed, the acquired document information is sent to the image forming apparatus corresponding to a printer 2 displayed on the feed display screen 1201, among the plurality of image forming apparatuses 103 managed by the printing control apparatus 102, which performs printing.

If printing is to be performed by the image forming apparatus 103 other than the image forming apparatus 103 displayed on the feed display screen 1201, the image forming apparatus 103 capable of performing printing is selected from a box 1203 for designating other printers.

When feed information that matches a registered print condition of document information is acquired from a server apparatus, the feed information can be transmitted to an image processing apparatus after adding information relating to an image forming apparatus capable of performing printing to the feed information.

Therefore, a user can confirm a preview image of document information to be printed, corresponding to the feed information which is added when the feed information is acquired, and a status of a selectable image forming apparatus 103. Thus, the burden of an operation for selecting the image forming apparatus on the user can be reduced.

According to the present invention, when the feed information that matches the registered print condition of the document information is acquired from the server apparatus, the feed information can be transmitted to the image processing apparatus after adding the information relating to the image forming apparatus capable of performing printing to the feed information.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-001773 filed Jan. 7, 2010, which is hereby incorporated by reference herein in its entirety.

What is claimed is:

1. A printing control apparatus to communicate with a document management server, an image forming apparatus, and an information processing apparatus, wherein the document management server manages document information, and wherein the information processing apparatus is operated by a user, the printing control apparatus comprising:

at least one processor coupled to a memory;

a storage unit configured to store a print condition table including element information and display information corresponding to the element information;

a first acquisition unit configured to acquire first feed information from the document management server using a uniform resource locator (URL) designated from the information processing apparatus through a subscription site setting screen, wherein the first feed information represents a state of the document information managed by the document management server;

a print condition setting screen generation unit configured to generate a print condition setting screen based on display information, wherein the display information is based on the first feed information element information according to the element information included in the print condition table;

a receiving unit configured to receive a print condition set via the print condition setting screen from the information processing apparatus, and configured to store the received print condition;

a condition determination unit configured to determine, after the first acquisition unit uses the URL to reacquire feed information from the document management server as second feed information, whether the second feed information matches the stored print condition stored by the receiving unit;
a second acquisition unit configured to acquire, from the document management server and in a case where the condition determination unit determines that the second feed information matches the stored print condition, a document and document information based on the second feed information;
a specifying unit configured to specify an available image forming apparatus based on an acquired status of the image forming apparatus;
an image a generation unit configured to, in a case where a first image forming apparatus and a second image forming apparatus are specified as the available image forming apparatus by the specifying unit, generate a first preview image based on first print setting information set in the first image forming apparatus and the acquired document information and generate a second preview image based on second print setting information set in the second image forming apparatus and the acquired document information; and
a transmission unit configured to transmit, to the information processing apparatus, third feed information, wherein the third feed information is generated by adding the first and second preview images generated by the image generation unit and information of the available first and second image forming apparatuses specified by the specifying unit to the second feed information that matches the stored print condition,
wherein the storage unit, the first acquisition unit, the print condition setting screen generation unit, the receiving unit, the condition determination unit, the second acquisition unit, the specifying unit, the image generation unit, and the transmission unit are implemented by the at least one processor.

2. The printing control apparatus according to claim 1, wherein the display information is based on the first feed information element information according to the element information included in the print condition table such that, in a case where a first element is included in the first feed information but is not included in the print condition table, the first element is not provided in the print condition setting screen.

3. The printing control apparatus according to claim 1, wherein the print condition setting screen is generate and sent to the information processing apparatus after the subscription site setting screen is displayed on the information processing apparatus.

4. The printing control apparatus according to claim 3, wherein the print condition setting screen is sent to the information processing apparatus and displayed with the already displayed subscription site setting screen.

5. The printing control apparatus according to claim 1, wherein the third feed information is configured to cause the information processing apparatus to display a feed display screen having information to directly utilize image forming apparatuses in a printable state and document preview images representing a result of printing performed by each of the printable state image forming apparatuses.

6. The printing control apparatus according to claim 1, wherein the printing control apparatus is configured to cause the information processing apparatus to display the print condition setting screen before the second acquisition unit acquires the document.

7. The printing control apparatus according to claim 1, wherein the printing control apparatus is configured to cause the information processing apparatus to display the third feed information transmitted by the transmission unit, to cause the information processing apparatus to control the first image forming apparatus to perform printing of the document with the first print setting information in a case where the user instructs a printing of the first preview image, and to cause the information processing apparatus to control the second image forming apparatus to perform printing of the document with the second print setting information in a case where the user instructs a printing of the second preview image.

8. A control method for a printing control apparatus to communicate with a document management server, an image forming apparatus, and an information processing apparatus, wherein the document management server manages document information, and wherein the information processing apparatus is operated by a user, the control method comprising:
storing a print condition table including element information and display information corresponding to the element information;
acquiring first feed information from the document management server using a uniform resource locator (URL) designated from the information processing apparatus through a subscription site setting screen, wherein the first feed information represents a state of the document information managed by the document management server;
generating a print condition setting screen based on display information, wherein the display information is based on the first feed information element information according to the element information included in the print condition table;
receiving a print condition set via the print condition setting screen from the information processing apparatus, and configured to store the received print condition;
determining, after using the URL to reacquire feed information from the document management server as second feed information, whether the second feed information matches the stored print condition;
acquiring, from the document management server and in a case where it is determined that the second feed information matches the stored print condition, a document and document information based on the second feed information;
specifying an available image forming apparatus based on an acquired status of the image forming apparatus;
in a case where a first image forming apparatus and a second image forming apparatus are specified as the available image forming apparatus, generating a first preview image based on first print setting information set in the first image forming apparatus and the acquired document information and generating a second preview image based on second print setting information set in the second image forming apparatus and the acquired document information; and
transmitting, to the information processing apparatus, third feed information, wherein the third feed information is generated by adding the generated first and second preview images and information of the specified available first and second image forming apparatuses to the second feed information that matches the stored print condition.

9. The control method according to claim 8, wherein the display information is based on the first feed information element information according to the element information included in the print condition table such that, in a case where a first element is included in the first feed information but is not included in the print condition table, the first element is not provided in the print condition setting screen.

10. The control method according to claim 8, wherein the print condition setting screen is generate and sent to the information processing apparatus after the subscription site setting screen is displayed on the information processing apparatus.

11. The control method according to claim 10, wherein the print condition setting screen is sent to the information processing apparatus and displayed with the already displayed subscription site setting screen.

12. The control method according to claim 8, wherein the third feed information is configured to cause the information processing apparatus to display a feed display screen having information to directly utilize image forming apparatuses in a printable state and document preview images representing a result of printing performed by each of the printable state image forming apparatuses.

13. The control method according to claim 8, wherein the printing control apparatus is configured to cause the information processing apparatus to display the print condition setting screen before the acquired document is acquired.

14. The control method according to claim 8, wherein the printing control apparatus is configured to cause the information processing apparatus to display the transmitted third feed information transmitted, to cause the information processing apparatus to control the first image forming apparatus to perform printing of the document with the first print setting information in a case where the user instructs a printing of the first preview image, and to cause the information processing apparatus to control the second image forming apparatus to perform printing of the document with the second print setting information in a case where the user instructs a printing of the second preview image.

15. A non-transitory storage medium storing a program to cause a printing control apparatus to perform a control method, wherein the printing control apparatus is to communicate with a document management server, an image forming apparatus, and an information processing apparatus, wherein the document management server manages document information, and wherein the information processing apparatus is operated by a user, the control method comprising:

storing a print condition table including element information and display information corresponding to the element information;

acquiring first feed information from the document management server using a uniform resource locator (URL) designated from the information processing apparatus through a subscription site setting screen, wherein the first feed information represents a state of the document information managed by the document management server;

generating a print condition setting screen based on display information, wherein the display information is based on the first feed information element information according to the element information included in the print condition table;

receiving a print condition set via the print condition setting screen from the information processing apparatus, and configured to store the received print condition;

determining, after using the URL to reacquire feed information from the document management server as second feed information, whether the second feed information matches the stored print condition;

acquiring, from the document management server and in a case where it is determined that the second feed information matches the stored print condition, a document and document information based on the second feed information;

specifying an available image forming apparatus based on an acquired status of the image forming apparatus;

in a case where a first image forming apparatus and a second image forming apparatus are specified as the available image forming apparatus, generating a first preview image based on first print setting information set in the first image forming apparatus and the acquired document information and generating a second preview image based on second print setting information set in the second image forming apparatus and the acquired document information; and transmitting, to the information processing apparatus, third feed information, wherein the third feed information is generated by adding the generated first and second preview images and information of the specified available first and second image forming apparatuses to the second feed information that matches the stored print condition.

16. The non-transitory storage medium according to claim 15, wherein the display information is based on the first feed information element information according to the element information included in the print condition table such that, in a case where a first element is included in the first feed information but is not included in the print condition table, the first element is not provided in the print condition setting screen.

17. The non-transitory storage medium according to claim 15, wherein the print condition setting screen is generate and sent to the information processing apparatus after the subscription site setting screen is displayed on the information processing apparatus.

18. The non-transitory storage medium according to claim 17, wherein the print condition setting screen is sent to the information processing apparatus and displayed with the already displayed subscription site setting screen.

19. The non-transitory storage medium according to claim 15, wherein the third feed information is configured to cause the information processing apparatus to display a feed display screen having information to directly utilize image forming apparatuses in a printable state and document preview images representing a result of printing performed by each of the printable state image forming apparatuses.

20. The non-transitory storage medium according to claim 15, wherein the printing control apparatus is configured to cause the information processing apparatus to display the print condition setting screen before the acquired document is acquired, and wherein the printing control apparatus is configured to cause the information processing apparatus to display the transmitted third feed information transmitted, to cause the information processing apparatus to control the first image forming apparatus to perform printing of the document with the first print setting information in a case where the user instructs a printing of the first preview image, and to cause the information processing apparatus to control the second image forming apparatus to perform printing of the document with the second print setting information in a case where the user instructs a printing of the second preview image.

* * * * *